United States Patent [19]

Fischell et al.

[11] 4,170,904

[45] Oct. 16, 1979

[54] SINGLE-AXIS DISTURBANCE COMPENSATION SYSTEM

[75] Inventors: Robert E. Fischell; Glen H. Fountain; Frederick F. Mobley, all of Silver Spring; Albert C. Sadilek, Elkridge, all of Md.

[73] Assignee: The United States of America as represented by the Secretary of the Navy, Washington, D.C.

[21] Appl. No.: 859,355

[22] Filed: Dec. 12, 1977

[51] Int. Cl.$^2$ .................................................. B64G 1/10
[52] U.S. Cl. .................................. 74/5.6 E; 244/166; 244/170; 244/171; 308/10; 74/5.46; 74/5.6 D; 74/5.6 A
[58] Field of Search ............... 244/166, 164, 170, 171, 244/1 R, 165; 308/10; 343/DIG. 2; 74/5.5, 5.6 R, 5.6 A, 5.6 D, 5.6 E, 5.46

[56] References Cited

U.S. PATENT DOCUMENTS

| Re. 26,177 | 3/1967 | Deutsch | 60/202 |
|---|---|---|---|
| Re. 26,887 | 5/1970 | McLean | 244/170 X |
| 3,114,518 | 12/1963 | Fischell | 244/166 |
| 3,360,655 | 12/1967 | McKeown | 250/231 SE X |
| 3,421,715 | 1/1969 | Cohlan | 244/166 |
| 3,483,761 | 12/1969 | Houghton et al. | 74/5.6 |
| 3,785,595 | 1/1974 | Fischell | 244/166 |
| 3,786,685 | 1/1974 | Lademann et al. | 74/5.5 |
| 3,810,683 | 5/1974 | Keever et al. | 308/10 |
| 3,813,946 | 6/1974 | Robbins, Jr. et al. | 74/5.6 X |
| 4,117,318 | 9/1978 | Pondrom, Jr. | 244/171 X |

FOREIGN PATENT DOCUMENTS 2048666 5/1972 Fed. Rep. of Germany ........... 244/166

OTHER PUBLICATIONS

APL Technical Digest, vol. 12, No. 2, Apr.–Jun., 1973.
Cosmic Research, (USA), vol. 8, No. 5, Sep.–Oct., 1970.
"Temperature Control of the Inertial-Grade Floated Rate-Integrating Gyroscope," IEEE Transactions on Automatic Control, vol. AC-15, No. 5, Oct. 1970.

Primary Examiner—Samuel Scott
Assistant Examiner—Don E. Ferrell

[57] ABSTRACT

The invention relates generally to an improved system for sensing and compensating for external disturbance forces acting on a satellite while in orbit. A proof mass member is housed within an enclosure and shielded from external, non-gravitational forces. The proof mass is electromagnetically levitated to move in a purely gravitational orbit, along an axis aligned with the satellite's velocity vector. The proof mass is subjected to a controlled magnetic biasing field and is caused to have a constant reaction to the resultant biasing force, by means of a thermal control system which maintains constant resistivity of the proof mass, during operation. The position of the proof mass with respect to its axis is detected optically and is utilized to control the firing of spacecraft thrusters. As a result, the satellite is caused to maintain a substantially constant position relative to the proof mass and thereby also is caused to follow a purely gravitational orbit.

10 Claims, 9 Drawing Figures

SINGLE-AXIS DISTURBANCE COMPENSATION SYSTEM

BACKGROUND OF THE INVENTION

It is generally well-known in the art of satellite control to provide an unsupported proof mass aboard a satellite, shielded from external non-gravitational forces so that it follows a purely gravitational orbit during operation of the satellite, and means responsive to motion of the satellite relative to the proof mass for controlling thrusters onboard the spacecraft which force the spacecraft to also follow the gravitational orbit, free from the effects of external surface forces such as solar radiation pressure and atmospheric drag. As a result, satellite position in orbit is predictable well in advance, thus significantly increasing the value of the satellite for navigational purposes, for example.

One major problem which was encountered in the use of early disturbance compensation systems of this type involved the need for very accurately determining mass attraction forces between satellite-carried components and the proof mass, in order to prevent such mass attraction forces from influencing the proof mass and thereby providing faulty operation of the system. In an effort to overcome the problem of mass attraction forces, U.S. Pat. No. 3,785,595 proposed the use of movable compensation masses or chargeable magnets (reacting with a diamagnetic proof mass), on three orthogonal axes relative to the proof mass, which could be controlled by commands from the ground tracking station, once the spacecraft was in orbit, to set up forces which counterbalance the mass attraction forces.

SUMMARY OF THE INVENTION

The present invention provides a single-axis disturbance compensation system much simpler than the three-axes compensation system previously proposed and disclosed, for example, in U.S. Pat. No. 3,785,595. More particularly, the present invention utilizes a proof mass fabricated from electrically conductive material which is suspended electromagnetically, by eddy current forces, to counterbalance mass attraction forces due to the spacecraft, while moving with essentially no friction along an axis aligned with the velocity vector of the spacecraft. The proof mass is housed in an enclosure attached to the spacecraft, shielded from all non-gravitational exterior forces such as solar radiation pressure, atmospheric drag and electrostatic attraction forces, so that the proof mass follows a purely gravitational orbit. A controlled magnetic biasing field is generated within the enclosure adjacent to the proof mass and exerts a preselected and controlled eddy current biasing force level on the proof mass in order to balance any along axis constant component of proof mass disturbance force. Essentially, this biasing system comprises two oppositely wound coils each configured to provide a constant force over the proof mass range of motion. In order to assure that the proof mass always reacts in a constant fashion to the biasing magnetic field, a thermal control system is provided in order to assure constant resistivity of the proof mass materials.

When the satellite is placed into orbit and is controlled to assume its orbital configuration, the proof mass is positioned at the center of mass of the spacecraft in alignment with the velocity vector. An optical detection system then monitors any movement of the proof mass both along and transverse to the velocity vector, as results from external forces on the satellite due to solar radiation pressure and atmospheric drag. The output of the optical detection system is utilized to operate thruster control apparatus which force the satellite to maintain a substantially constant relative position with respect to the proof mass and whereby the satellite is also caused to follow the purely gravitational orbit.

In light of the above, one object of the present invention is to provide an improved system for controlling a satellite to maintain a purely gravitational orbit, not affected by external forces such as solar radiation pressure and atmospheric drag.

Other objects, purposes and characteristic features of the present invention will be pointed out as the description of the invention progresses and will in part be obvious from the accompanying drawings.

BRIEF DESCRIPTION OF THE DRAWINGS

Referring now to FIG. 1, a gravity-gradient stabilized satellite is illustrated in its orbital configuration; that is, four solar panels 11 are deployed from the main satellite body 12 along with the gravity-gradient stabilizing boom 13. In this configuration, the satellite's communication antenna 14 is pointing towards Earth, for example. The satellite is yaw-stabilized, in a conventional manner, by a momentum wheel (not shown) which generates an angular momentum vector which tends to align itself with the orbit normal; the accuracy of the yaw stabilization being dependent upon the requirements of practice. In one practical application, for example, attitude stability was designed with a 3° maximum amplitude periodic librations for roll, pitch and yaw which average to zero about the respective bias angles of ±0.5° in yaw and ±1.5° in pitch relative to the velocity vector. Variations in the yaw bias angle due to thermal boom bending, solar panel deflection, and other intermittent sources were designed to cause less than 0.042° deviations in the yaw bias angle over a preselected time period, e.g. seven days.

In accordance with the present invention, the satellite carries a disturbance compensation system package, generally designated at 15, which is carried on the boom assembly 13 and is positioned in alignment with the satellite velocity vector when in orbit (designated as the ±X axis) and at the known center of mass of the satellite when in its illustrated orbital configuration. In the practical application noted above, the proposed sensor unit 15 was designed for alignment of its axis within ±0.2° in yaw and within ±1.0° in pitch of the velocity vector.

Figure 2:
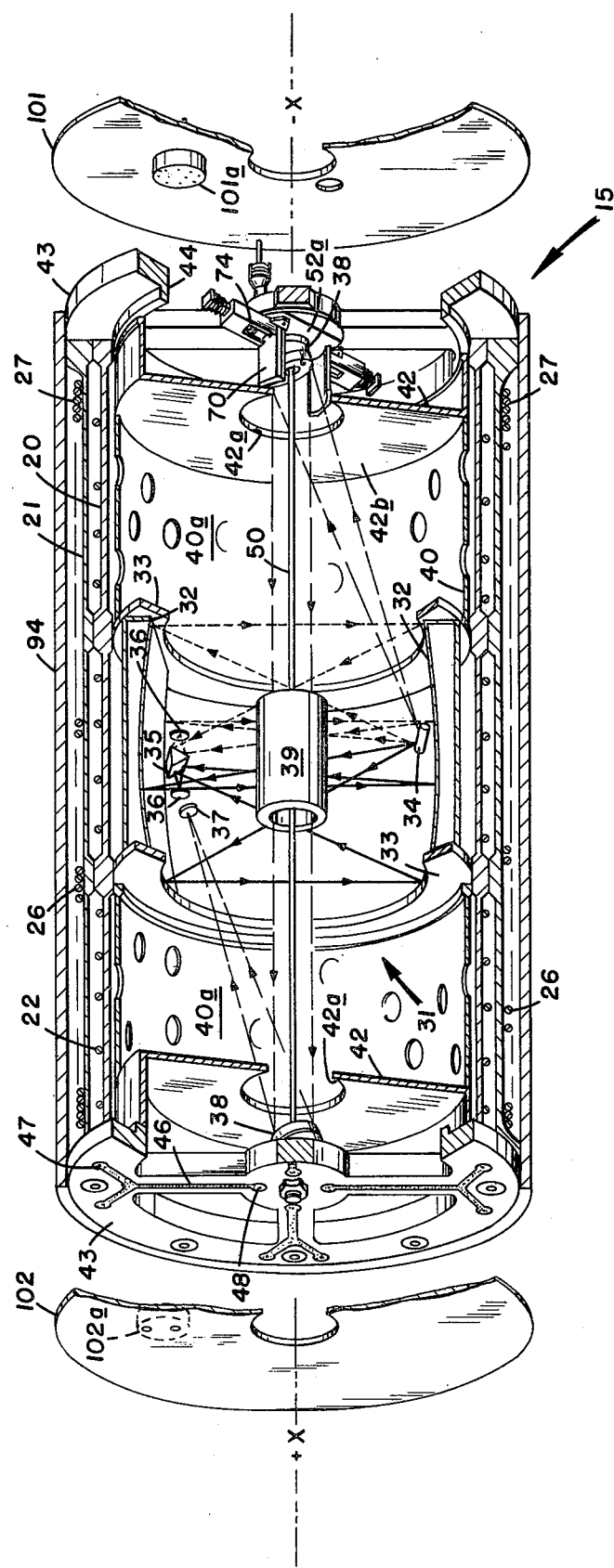
FIG. 2 is a partial isometric view of the basic sensor unit utilized in the illustrated embodiment of the present invention.

FIG. 2 of the drawings illustrates, in somewhat simplified form, the structural details of the sensor unit 15 comprising the preferred embodiment of the present invention. As shown, the sensor unit 15 is essentially cylindrical in over-all configuration and comprises a pair of mating cylinders 20 and 21 fabricated from suitable non-conductive materials. In one practical application, the outer cylinder 21 is fabricated from grade G-10 epoxy fiberglass; whereas, the inner cylinder 20 is fabricated from beryllium oxide which has high thermal and low electrical conductivity.

Figure 3:
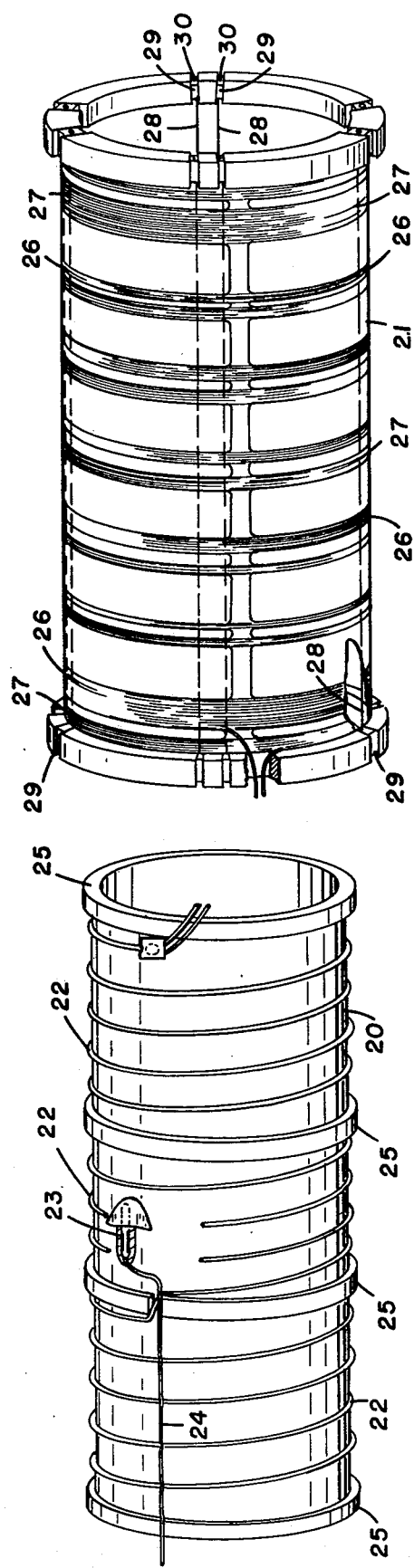
FIG. 3 is an isometric view of two cylindrical members forming respectively solenoid and heater subsystems of the sensor unit of FIG. 2.

A disassembled view of the cylinder members 20 and 21 is shown in FIG. 3. The inner cylinder 20 carries a bifilar Nichrome heater winding 22 which is wound over the length of the cylinder 20 and is connected, via its right-hand end in FIG. 3, to a suitable energizing source (not shown) to be described hereinafter. The cylinder 20 also carries a thermistor 23 which is mounted, e.g., within a suitable slot in the cylinder wall, so as to monitor the temperature within the cylinder 20. The thermistor 23 is connected electrically by wire 24 to a temperature control arrangement, to be described, whereby the internal temperature of the sensor unit 15 is maintained constant. The cylinder 20 is formed with end and intermediate ridges 25 which engage against corresponding ridges on the internal surface of the slightly larger diameter cylinder 21, as can be best seen in FIG. 2. A slight space is thereby created between the cylinders 20 and 21 to accommodate the windings 22 and the thermistor electrical connection.

The cylinder 21 carries a pair of oppositely wound biasing coils 26, 27 which are disposed in suitable, spaced notches extending around the periphery of the cylinder 21, in groups containing preselected integral numbers of windings of the biasing coils. The ridges on the interior wall of the cylinder 21 are each provided with four pairs of longitudinal slots, each adopted to receive therein a length of resistive type wire 28 which extends along the inner surface of the cylinder 21 and terminates at a suitable connector element 29 whose outermost surface has a threaded hole, as shown at 30. In one practical application, the wires 28 are #18 gauge manganin wire.

Centrally disposed within the cylinder 20 is an optical system generally designated at 31 in FIG. 2. Specifically, the optical system 31 comprises a pair of parabolic mirror members 32 which are supported on opposite sides of the sensor unit 15 by means of mounting rings 33 whose edges engage one of the ridges 25 on the inner surface of cylinder 20. The optical system also comprises a light source represented at 34; a beam splitting prism 35; a pair of photocells 36 disposed on opposite sides of the prism 35; and, a third photocell 37. This third photocell 37 receives a beam of light from the source 34 by means of mirrors 38 which are mounted at the opposite ends of the cylindrical sensor structure, on the longitudinal ±X reference axis.

Light emanating from the light source 34 is basically divided into three beam paths: one (shown in dash dot lines) which impinges on the right-hand end mirror 38 and is directed from right to left in FIG. 2 between the end mirrors 38 and eventually to the photocell 37, and two light beams (one shown in short dash lines and the other shown in solid lines) which are directed upwardly in FIG. 2 against the upper parabolic mirror 32, then downwardly against the lower parabolic mirror 32 and finally to the prism 35 which directs one of these two beams against each of the oppositely disposed photocells 36. The latter two light beams reflected between the mirrors 32 are arranged to intercept the ends of a cylindrical proof mass member 39, so that the division of light between the photocells 36 provides indication of the longitudinal position of the proof mass 39 along the reference axis ±X; whereas, the light beam reflected between the end mirrors 38 is sized to correspond with the diameter of a central aperture through the proof mass 39 so that the light impinging upon photocell 37 provides indication of the position of the proof mass 39 transverse to the reference ±X axis.

Positioned on either side of and abutting the mirror support rings 33 is a pair of cylindrical spacer members 40 also fabricated from grade G-10 epoxy fiberglass, for example, which have a plurality of holes fabricated therein for communicating the heat produced by energization of the heater coil 22 into the interior of the sensor unit 15 so as to maintain the temperature of the proof mass 39 constant. Abutting the extending ends of the spacer members 40 are a pair of cup-shaped epoxy fiberglass members 42, each formed with a central aperture 42a. The interior surface 42b of the members 42, the interior surface 40a of the spacers 40 and the exposed surfaces of the optical system support structure are made electrically conductive, for example, by painting them with a black silicate paint doped with carbon, such as that developed by NASA and known as MSA-94B. This renders the internal sensor cavity optically absorbing in order to protect the photocells 36, 37 from stray radiation from the optical system lamp 34 and, at the same time, develops a common electrically equipotential surface within the sensor to remove localized electrostatic potential build-up in order to prevent forces of electrostatic attraction on the proof mass 39 by all components within the sensor interior cavity. This equipotential surface also bleeds off electrical charge created by radiation from the lamp 34 and by the incident flux of high-energy particles present in the space environment. However, the surface is not conductive enough to sustain eddy currents generated by the bias coils 26, 27 of a magnitude large enough to distort the biasing coil magnetic field.

The proof mass 39 itself is comprised of a cylinder of highly conductive material in which eddy currents can be created. In the practical application noted above, the proof mass 39 is formed of 0.410" I.D.×0.670" O.D.×1.240" long cylindrical shell of pure aluminum, with a 10,000 Å-20,000 Å gold surface plating to prevent formation of oxides which create localized electrostatic potential and to allow the proof mass 39 to reach electrostatic equilibrium within the inner sensor cavity. The proof mass 39 is also purposely designed with a very low temperature coefficient of resistivity; i.e., ≦0.004 ohms/ohm/°C., so that when operating in the controlled temperature environment existing within the sensor 15, the proof mass will react in a constant manner to the biasing (eddy current) forces.

Figure 5:
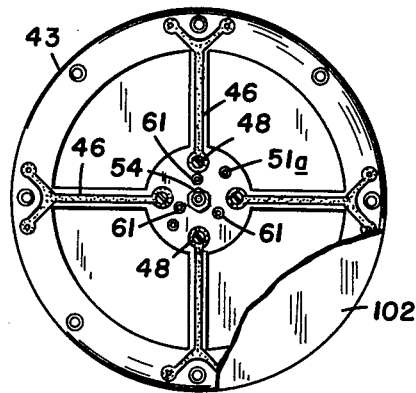

At each end of the sensor unit 15 is a spoked ring member 43 fabricated from a suitable plastic such as Lexan. The inner surface of each member 43 is provided with a collar 44 to support the ends of cylinders 20 and 21, in assembled position. The outer surface of each member is formed with four radially extending conductive strips 46 (see FIGS. 2, 5, and 6), each of which is bifurcated to connect to the four pairs of resistive wires 28 extending longitudinally along the inner surface of the biasing coil cylinder member 21, as previously described and as shown in FIG. 3. In particular, the outer extending ends of conductive strips 46 are connected to the wire pairs 28 by means of screws 47 which extend through the members 43 and into the holes 30 in the wire terminal members 29 shown in FIG. 3.

Figure 4:
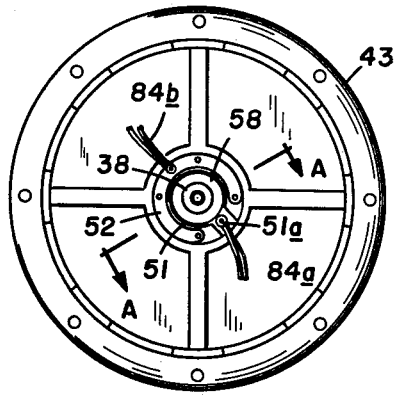
FIGS. 4 and 5 are front and back views of the end cap located at the left-hand end of the sensor of FIG. 2.

The opposite inner ends of the conductive strips 46 are interconnected electrically by screws 48 which extend through the associated member 43 and are threaded into a suitable electrically conductive collector member mounted on the internal surface of the end member 43, to thereby connect the conductive strips 46 in series with a central conductor member 50 which extends longitudinally through the end mirrors 38 and the proof mass 39 between the end members 43, on the $\pm X$ reference axis. At the left-hand end of the sensor unit (see FIGS. 4 and 6), the conductor 50 is connected to a centrally-disposed disc 51 of conductive material, formed with an integral terminal tab 51a. A slotted annular conductor member 52 surrounds and is insulated from the conductor disc 51 and is electrically connected to the conductive strips 46 on the opposite surface of the Lexan end member 43 by means of the aforementioned screws 48.

Figure 6:
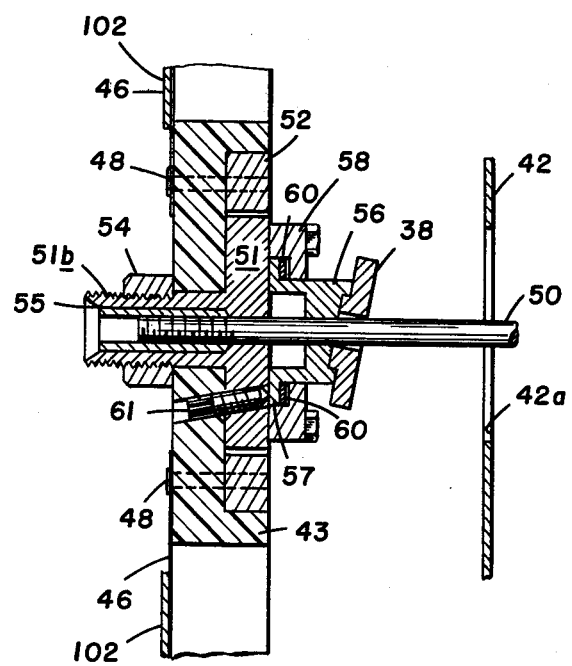
FIG. 6 is an enlarged partial sectional view taken along line A—A in FIG. 4.

As shown in FIG. 6, the conductor disc 51 has a centrally disposed base or stem portion 51b which is threaded at one end and which extends through the Lexan end member 43 to receive a nut 54 which locks the member 51 in position. The conductor disc 51 is provided with an aperture which extends through the stem portion 51b thereof to accommodate the central conductor 50, whose ends are threaded to receive a nut 55 which is inserted into the stem portion 51b of the conductor disc to firmly attach the ends of the central conductor 50 in assembled position in the sensor unit 15.

The radial conductive strips 46 and the equal relative high resistance paths provided by the resistive wires 28 between the ends of the central conductor 50 assure even symmetrical distribution of return currents lengthwise of the sensor unit 15 and thereby prevent undesired biasing of the proof mass 39 which would occur if asymmetrical return currents existed.

Secured to the inner surface of the conductor disc member 51 is a mirror assembly for supporting the mirrors disc 38 in an adjustable position on the reference $\pm X$ axis. As shown in FIG. 6, for example, the mirror plate 38 is formed with a raised base portion adapted to be bonded, e.g., by epoxy, into a circular recess formed in a canted end of a mounting pedestal member 56. The member 56 has a base flange 57, around which is disposed an anchoring collar 58 for connecting the mirror assembly to the conductor disc 51 by means of suitable screws, for example. An annular space exists between the base flange 57 and the anchoring collar 58 to accommodate a spring washer 60 which resiliently biases the base of the mirror mount 56 against the conductor disc 51. Three mirror adjusting set screws, one of which is shown in FIG. 6 at 61, are disposed at regular 120° intervals around the conductor 51 to adjust the position of the mirror 38 against the biasing force of the spring washer 60, in order to assure that the light beam reflected between mirrors 38 is properly aligned with the reference $\pm X$ axis, the central aperture in the proof mass 39, the photocell 37, and the light source 34.

Figure 7:
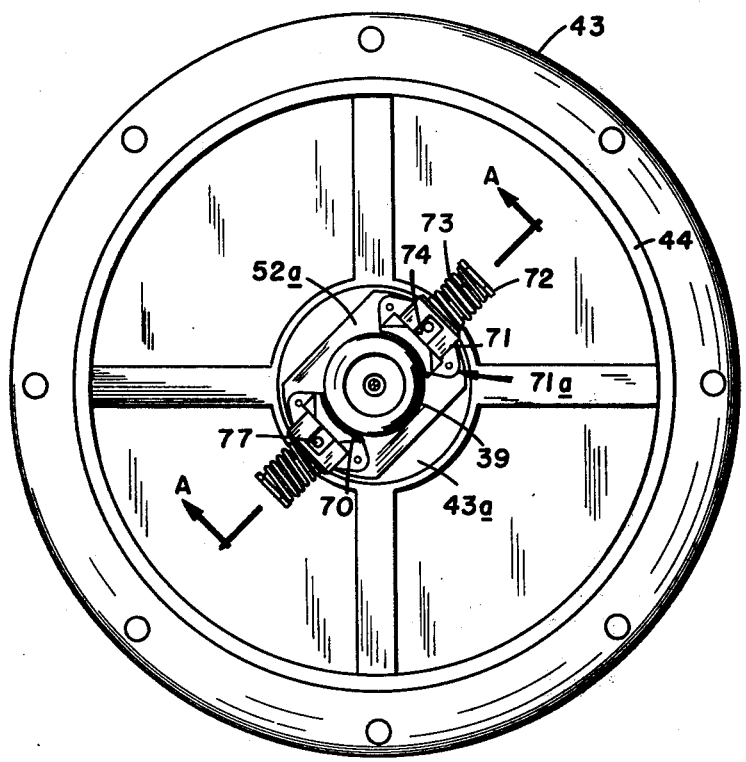
FIG. 7 is a simplified enlarged view of the inside surface of the end cap located at the right-hand end of the sensor of FIG. 2, to illustrate the caging mechanism for the proof mass.
Figure 8:
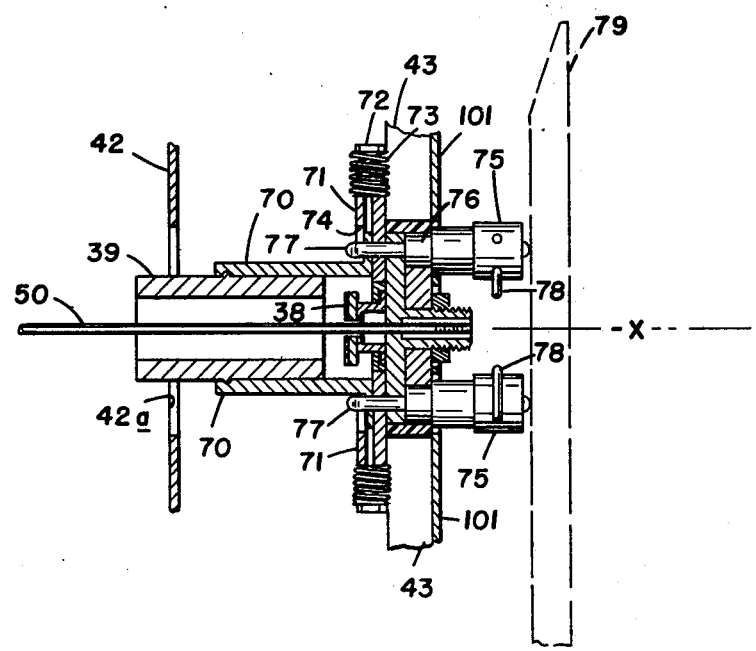
FIG. 8 is an enlarged partial section taken along line A—A in FIG. 7.

At the right-hand end of the sensor unit 15, in FIG. 2, is a caging mechanism for holding the proof mass 39 in fixed position, during launching of the satellite and prior to deployment of the boom assembly 13, with the sensor unit 15 attached, into the orbital configuration. FIGS. 7 and 8 of the drawings illustrate the details of the proof mass caging mechanism. In particular, the caging mechanism comprises a pair of substantially L-shaped caging fingers 70 which are adapted to engage the upper and lower surfaces of the proof mass 39, by means of a central ridge which extends around the proof mass 39 and mates with notches on the inner surface of each caging finger 70. Each caging finger 70 has an extending leg portion which extends through a holder 71 and terminates in an enlarged cap 72 installed at its end. The holder 71 is secured, by means of mounting ears 71a, to the single conductor disc 52a which is disposed within a central circular recess 43a in the Lexan end member 43. The conductor disc 52a is connected electrically to the four conductive strips 46 (not shown) that extend along the spokes of member 43 on the outermost right-hand surface thereof and connect the right-hand ends of the resistive wires 28 to the disc 52a (and central conductor 50). A coil spring 73 is disposed between the enlarged cap 72 of the finger 70 and the upper surface of the holder member 71, as illustrated in FIG. 8. The forward or left-hand surface of the holder members 71 is provided with a partial slot 74, best shown in FIGS. 2 and 7, which is slightly wider than the extending leg portion of the finger 70 so that the fingers 70 may move radially upward from, i.e., uncage, the proof mass 39 as will be discussed shortly.

Figure 1:
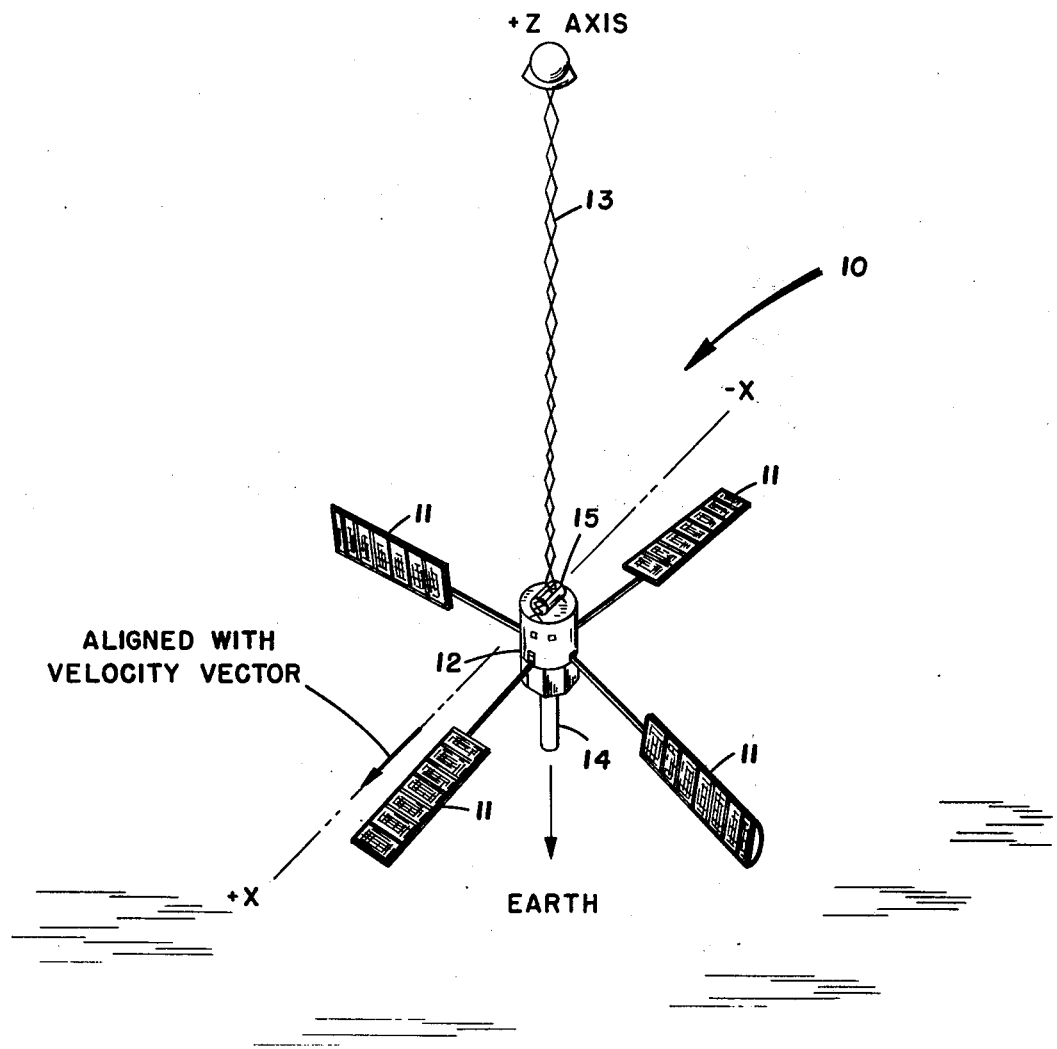
FIG. 1 illustrates a conventional gravity-gradient stabilized satellite, in its orbital configuration, equipped with a disturbance compensation system constituting one embodiment of the present invention.

The fingers 70 are retained in the caging or locking position relative to the proof mass 39 by means of plunger assemblies 75 each comprising a housing 76, which is fixed to the end member 43, and a spring-loaded plunger element 77 which extends through a hole in the conductor disc 52a, through the rear surface of the caging holder 71 and through the extending leg of the caging finger 70. Each plunger mechanism 75 is provided with a locking pin 78 which maintains the plunger 77 in its depressed position (as shown in FIG. 8) prior to mounting the sensor unit 15 onboard the satellite. Once the sensor is mounted on-board the satellite, in its prelaunch configuration, the plungers 77 are maintained in their depressed position by means of a suitable plate member or the like, shown dotted at 79 in FIG. 8, which is anchored to the satellite body in a position such that it contacts the ends of the plungers 77 until the boom assembly 13 is deployed to an orbital condition (see FIG. 1). At this time, the spring-biased plunger elements 77 are ejected and the springs 73 urge fingers 70 out of contact with the proof mass 39 and thereby release the mass 39.

With current applied to the central conductor 50, an eddy current suspension force is exerted radially on the proof mass 39 proportional to the radial offset of the proof mass and to the square of the applied current. This force acts to electromagnetically levitate the proof mass 39 relative to the conductor 50. As will be described hereinafter, when considering operation of the sensor unit 15, the proof mass 39 is also acted upon by a biasing force directed along the reference $\pm X$ axis, also resulting from repulsion of eddy currents induced in the proof mass 39.

When the satellite is first placed in its orbital configuration, the proof mass 39 will slowly migrate along the ±X axis as the satellite is subjected to acceleration/deceleration as a result of solar radiation pressures and atmospheric drag. During this migration, the proof mass 39 will pass through the optical detection region of the sensor 15 and will be captured in its desired operating position, by a control system now to be described.

Figure 9:
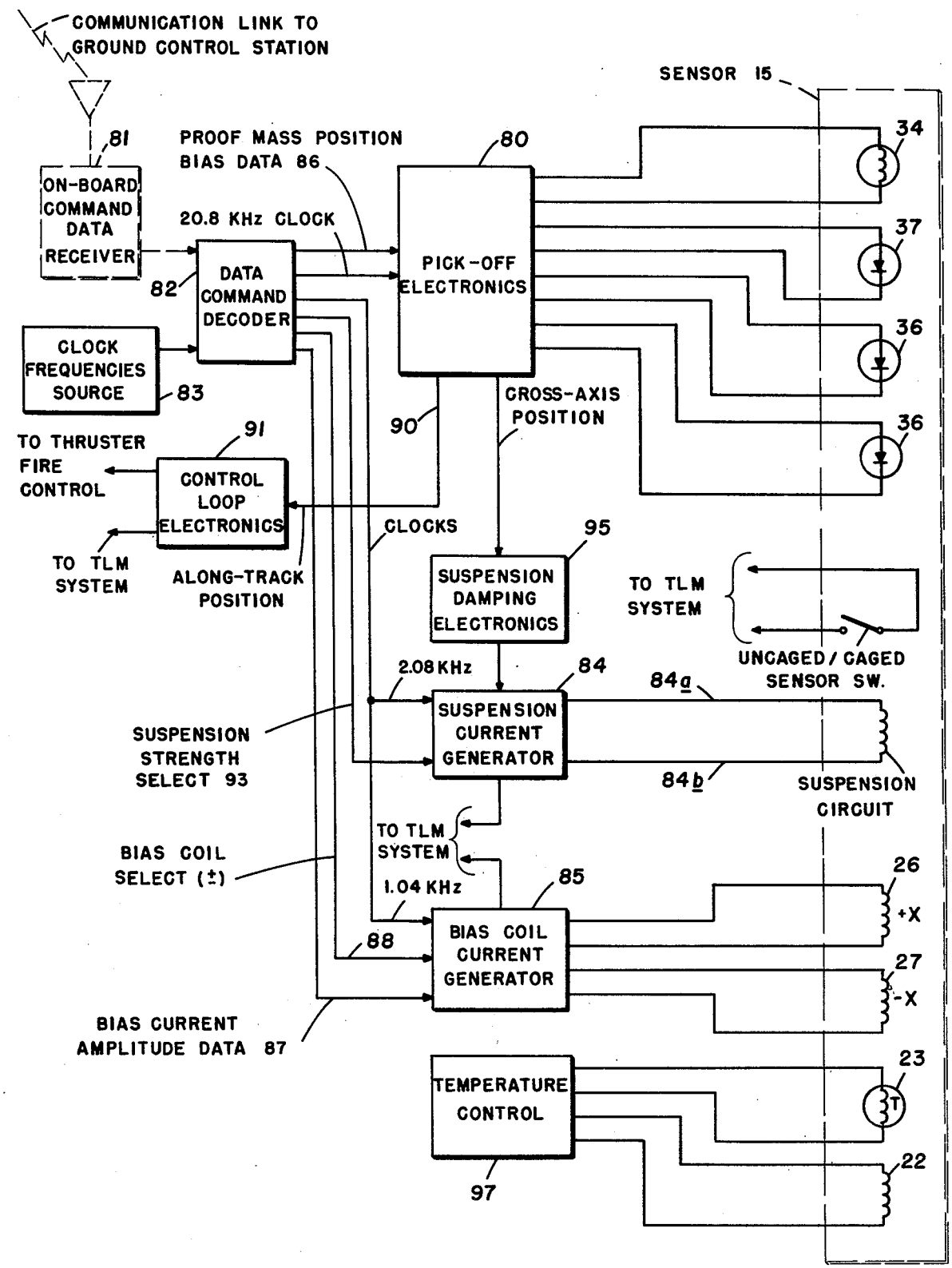
FIG. 9 illustrates typical control circuitry utilized with the illustrated embodiment of the present invention.

FIG. 9 of the drawings illustrates, in block diagram form, the control circuitry associated with the sensor unit 15. In particular, a pick-off electronics unit 80 of conventional circuit design is utilized to energize the sensor lamp 34 from a 20.8 KHz clock supply carried onboard the spacecraft and also to monitor the output of the photocells 36 and 37, in order to detect along axis and cross or transverse axis positions of the proof mass 39. An on-board command data receiver shown in dotted form at 81 is connected, via any convenient communications link, to a ground control station. The command data received at 81 is input to a data command decoder 82 which detects or decodes the incoming commands and outputs them to the remainder of the control system. The command decoder 82 is also connected to a clock frequency source 83 and outputs three basic clock frequencies; i.e., a 20.8 KHz clock which is applied via the pick-off electronics 80 as the AC energizing source to the lamp 34, a 2.08 KHz clock which is applied as input to a suspension current generator 84, and a 1.04 KHz clock which is supplied to the illustrated bias coil current generator 85.

The suspension current generator 84 is connected by wires 84a, b (see FIG. 4) between the central conductor disc 51 and the surrounding conductor ring 52, to thereby provide an energizing source to the series circuit comprised of the central conductor 50, the conductive strips 46 at each end of the sensor, and the connected resistive wire pairs 28 which extend along the inner surface of the cylinder 21, as shown in FIG. 3. The resultant A.C. current flow through the axial conductor 50 produces an eddy current repulsion force on the proof mass cylinder 39 which levitates or centers the proof mass about the conductor 50 for frictionless motion along the reference ±X axis. This suspension force, commandable to different levels, maintains the proof mass 39 suspended in directions normal to the reference axis (and the central conductor 50) and compensates for all external forces normal to this axis, e.g., solar radiation pressure and mass attraction forces resulting from nearby spacecraft-carried components.

Forces on the proof mass 39, directed along the reference axis, are controlled by a biasing system which provides a vernier compensation for spurious, constant level forces acting on the proof mass 39, along the reference axis, for example as a result of mass attraction forces produced by an unbalanced location of spacecraft-carried components. Initialization of the bias force acting on the proof mass 39 is derived from tracking data indicating orbit anomalies being experienced by the satellite during its normal operation.

The in-orbit vernier control of the along-track bias forces on the proof mass 39, e.g., in order to compensate for mass attraction forces along the ±X axis, is provided by bias current amplitude data output from the decoder 82, on line 87, to the bias coil current generator 85. A bias coil select signal on line 88 determines whether biasing coil 26 or the oppositely wound biasing coil 27 should be energized, depending upon whether the spacecraft is tracked as accelerating or decelerating from its nominal orbit velocity. The bias coil current generator 85 responds to the signals on lines 87, 88 and the 1.04 KHz clock from decoder 82 to generate a 1.04 KHz sine wave energizing current, to coil 26 or 27, which is amplitude modulated by the amplitude data input on line 87. In the practical embodiment of the present invention mentioned above, the biasing coil current is commandable to a maximum value of 31.4 ma. (producing $1.22 \times 10^{-8}$ g force on the proof mass) in 0.01534 ma. increments, with a maximum incremental force of $1.2 \times 10^{-11}$ g, thus providing precise in-orbit tailoring of the proof mass axial forces.

As previously described, the biasing coils 26, 27 are designed, i.e., arranged in groups on cylinder 21, to produce a linear variation of the quare of the magnetic field B along the reference ±X axis, in the vicinity of the proof mass 39. The resulting bias force, produced by repulsion of eddy currents induced in the aluminum proof mass 39 is proportional to the integral over the proof mass length (1); i.e., $$\int_0^1 B(x) \frac{dB}{dX} dX = \frac{B^2(1)}{2} - \frac{B^2(0)}{2}$$

Therefore, by designing each biasing coil 26, 27 to provide linear variation of the quantity $B(x)^2$, a constant axial biasing force is produced on the proof mass 39 independent of its axial displacement along the reference ±X axis. In the practical embodiment of the present invention discussed above, 26 ga. copper wire is used to form each biasing coil 26, 27, with integral numbers of 14, 3, 8, 8, 10, 6, and 26 turns in each of seven groups located −10.160, −6.353, −3.647, −0.478, +2.685, +5.819, and +9.009 cm. respectively in an axial position measured in opposite lengthwise directions from the center of the proof mass when in its normal position (centered as in FIG. 2).

As previously noted, the photocells 36 are utilized to detect the along-track (axial) position of the proof mass 39. More particularly, the pick-off electronics unit 80 contains conventional circuitry which monitors the difference between the outputs from the photocells 36 and produces an error signal on line 90 which is applied to and controls the operation of a control loop electronics unit 91. The unit 91 is also of well-known design, its details being described on pages 16 and 17 of the APL Technical Digest, Volume 12, No. 2 (April-June 1973) published by the Applied Physics Laboratory of The Johns Hopkins University. Basically, the control unit 91 responds to the along-track position signal on line 90 and controls the spacecraft thrusters to adjust the position of the satellite relative to the proof mass 39 until the proof mass is returned to its initial precise position and thereby compensate for the solar radiation pressure and/or atmospheric drag on the satellite which initially caused the proof mass to move along the reference axis. Thereby, the spacecraft is controlled to follow the purely gravitational orbit of the proof mass 39. As shown in FIG. 9, the along-track position of the proof mass 39 is also supplied, by control loop electronics unit 91, to the satellite telemetry system for telemetering back to the ground control station. Moreover, if a significant along-track mass attraction force exists on the proof mass 39, the resulting optical system output error signal on line 91 will cause unwanted acceleration/deceleration of the satellite, unless the mass attraction force is compensated for, i.e., biased out. As discussed above, this compensation is accomplished by selective energization of the biasing coils 26, 27 (depending upon whether acceleration or deceleration is observed in the tracking data) with a current whose amplitude produces the proper amount of along-track biasing force on the proof mass 39 to cancel out the effect of the mass attraction force.

Initialization of the position of the proof mass 39 is controlled by a command transmitted from the ground control station to the command data receiver 81, e.g., based upon the output of the optical system 31 as telemetered to the ground station. Thus, if the proof mass 39 is not at the center of mass of the orbiting satellite, modulation will be observed in the output of the transverse photocell 37 as the satellite orbits. In response, the ground station transmits an appropriate position bias data command which is outputted on line 86 by decoder 82, and summed with the output of photocells 36 in the pick-off electronics 80 to produce a position bias for the proof mass 39. As a result, an along-track position error appears on line 90 which actuates the thruster control, via control unit 91; the axial position of the proof mass 39 is thereby adjusted, placing it precisely at the center of mass of the satellite when in an orbital configuration (as verified, for example, by observing reduced modulation in the telemetered optical system output).

As noted earlier, the proof mass 39 is electromagnetically suspended or levitated relative to the reference $\pm X$ axis by current supplied to central conductor 50 by the suspension current generator 84. More particularly, the suspension current generator 84 receives a 2.08 KHz clock signal from the data command decoder 82 and generates four possible amplitude levels of square wave energization current on lines 84a, b connected to the suspension circuit; i.e., the 2.08 KHz clock frequency is amplitude modulated depending upon the value of the suspension strength select signal applied to the generator 84 from the data command decoder 82 via control line 93. This suspension current strength select signal on line 93 is ground-commanded, e.g., as two bits of a digital command word which permits four possible levels of suspension force, e.g., in even increments from 165 to 645 milliamps to produce from $4 \times 10^{-8}$ g to $6.3 \times 10^{-7}$ g force levels in the practical application mentioned above. The particular suspension force level selected is that which will enable the proof mass 39 to be effectively damped in a transverse or cross-axis direction, as will now be discussed.

The transverse or cross-axis position of the proof mass 39 is monitored at pick-off electronics unit 80, in response to the output of the photocell 37 (see FIG. 2). The resulting cross-axis position signal is applied to the suspension damping electronics unit 95 which functions to take the time derivative of the cross-axis position signal and thereby determine the rate of transverse motion of the proof mass 39. The transverse rate signal output from the unit 95 is applied to the suspension current generator 84 to effectively amplitude modulate the suspension current value, about its selected level, and thereby eliminate transverse oscillations of the proof mass 39 relative to the reference $\pm X$ axis. In the above-noted practical application of the invention, the suspension current is modulated about its selected value by a constant of 7.3 ma/(mm/sec) times the transverse rate in mm/sec, up to a maximum of 1.1 amps.

Also shown in FIG. 9 is the closed-loop thermal control system for maintaining the temperature within the sensor 15 at a preselected level, in order to maintain constant resistivity of the proof mass materials and therefore also its eddy current forces. In the practical embodiment of the present invention referred to previously, the internal sensor temperature is stabilized to 70° F.$\pm$0.5° F.

This temperature control includes the thermistor 23 mounted on the cylinder 20 (see FIG. 3) to monitor the internal sensor temperature and temperature control unit 97 which is controlled by the thermistor 23 to energize the heater winding 22 (wound on the cylinder 20) as necessary to maintain constant temperature within the sensor unit, paritcularly in the vicinity of the proof mass 39. In order to help assure a constant temperature within the sensor unit 15, a suitable thermal blanket 94 is provided to cover the entire outer surface of the sensor unit.

As also shown in FIG. 2, the ends of the sensor unit 15 are covered with suitable flat circular end plates 101 and 102 which are attached, e.g., by bolting them to the members 43 at each end of the sensor unit. The end plates 101 and 102 are provided, if need be, with electrical terminal members 101a and 102a respectively for permitting connection of the internal windings, etc. to the external control/energizing circuitry. The end plate 101 also includes a pair of circular apertures to accommodate the uncaging plunger assemblies 75 which eject when the sensor unit 15 is deployed by the stabilizing boom assembly, as previously described. The end plates 101, 102 are also covered with a suitable thermal blanket material in order to help assure constant temperature conditions within the sensor unit.

Other modifications, adaptations and alterations to the present invention are of course possible in light of the above teachings. Therefore, within the scope of the appended claims, it should be understood that the invention may be practiced otherwise than as specifically described hereinabove.

What is claimed is:

1. In a system for controlling an artificial earth satellite equipped with thruster means to move at a predetermined velocity along a pure gravitational orbit, the improvement comprising,
    an enclosure attached to the satellite substantially in alignment with the velocity vector of the orbiting satellite,
    an electrically conductive proof mass means disposed within said enclosure and shielded thereby from external non-gravitational forces while said satellite is orbiting,
    said enclosure having interior surfaces disposed symmetrically relative to said proof mass means and forming an equipotential surface to shield said proof mass from electrostatic forces,
    means for generating a controllable eddy current suspension force on said proof mass means to suspend said proof mass means on a reference axis substantially aligned with the velocity vector of the orbiting satellite,
    means for generating a controllable eddy current biasing force on said proof mas means in either direction along said reference axis to position said proof mass means along said axis,
    thermal control means for maintaining a constant temperature within said enclosure to keep constant the electrical resistivity of said proof mass means to eddy currents and thereby also the reaction of said proof mass means to said suspension and biasing forces, means for detecting the position of the proof mass means along said axis, and thruster control means responsive to said position detecting system for accelerating/decelerating said satellite to maintain a substantially constant position relative to said proof mass means, whereby said satellite also follows a purely gravitational orbit.

2. The satellite control system specified in claim 1 wherein said thermal control means includes a thermistor for monitoring the temperature within said enclosure adjacent said proof mass means, a heater wire, and an energizing control circuit for said heater wire responsive to the temperature monitored by said thermistor.

3. The satellite control system specified in claim 1 wherein said proof mass means comprises a cylindrical member formed of electrically conductive material and having a central aperture extending through and along the longitudinal axis of the cylinder, and said means for generating a controllable eddy current suspension force includes a central conductor wire extending through the aperture within said proof mass means along said reference axis, a source of energizing current connected to one end of said central conductor wire, and a plurality of resistive return wires symmetrically disposed relative to said proof mass and connecting the other end of said central conductor wire to said energizing current source.

4. The satellite control system specified in claim 3 wherein said means for detecting the position of the cylindrical proof mass relative to said reference axis comprises an optical system including, a light source means for transmitting first and second light beams across said reference axis adjacent the opposite ends of said cylindrical proof mass and a third light beam along said reference axis through the central aperture within said cylindrical proof mass, and light detector means for detecting the amount of each light beam intercepted by said proof mass to determine the longitudinal and transverse positions of said proof mass relative to said reference axis.

5. The satellite control system specified in claim 4 wherein the internal surfaces of said enclosure are optically absorbant to stray radiation from said light source.

6. The system specified in claim 3 wherein said enclosure comprises, a first hollow cylinder member fabricated of non-magnetic, electrically non-conductive and thermally conductive material, said cylinder having its central longitudinal axis aligned with the velocity vector of the satellite to define a reference axis, said hollow cylindrical proof mass means being disposed within said first cylinder with its longitudinal axis aligned substantially with said reference axis, a thermistor disposed to monitor the temperature inside said first cylinder, a winding mounted on said first cylinder and being energized in response to the temperature monitored by said thermistor to maintain a constant temperature within said first cylinder, a second cylinder of non-magnetic, electrically non-conductive material adapted to receive and encompass said first cylinder in mating relationship, and a pair of selectively energizable windings wound around said second cylinder in groups of varying numbers of turns selected to create a linear variation of the square of the magnetic biasing field within said first cylinder along said reference axis effective to exert a controllable constant level biasing force on said proof mass means along said reference axis.

7. The satellite control system specified in claim 6 further including an optical system supported within said first hollow cylinder for detecting the position of said proof mass means relative to said reference axis, said optical system comprising, a light source means for transmitting first and second light beams across said reference axis adjacent the opposite ends of said cylindrical proof mass and a third light beam along said reference axis through the central aperture within said cylindrical proof mass, and light detector means for detecting the amount of each light beam intercepted by said proof mass to determine the longitudinal and transverse positions of said proof mass relative to said reference axis, the interior surfaces within said enclosure surrounding said optical system and said proof mass being optical absorbant to stray radiation from said light source and forming an equipotential surface shielding said proof mass from electrostatic forces.

8. The satellite control system specified in claim 1 wherein said means for generating a controllable eddy current biasing force on said proof mass means comprises a pair of energizable windings wound to produce a linear gradient of the square of the magnetic field strength B in opposite directions along said reference axis, ánd means for selectively energizing said winding pair with a controlled current amplitude.

9. The satellite control system specified in claim 1 further comprising means for retaining said proof mass means in a fixed position until said satellite is placed in its orbital configuration.

10. The satellite control system specified in claim 1 wherein said means for detecting the position of said proof mass means along said reference axis comprises an optical system including a light source means for transmitting light across said reference axis adjacent opposite ends of said proof mass means, and light detector means for detecting the amount of light intercepted by each end of said proof mass means.

* * * * *